V. W. & L. S. BLANCHARD.
Coffee Pot.
No. 228,862.  Patented June 15, 1880.
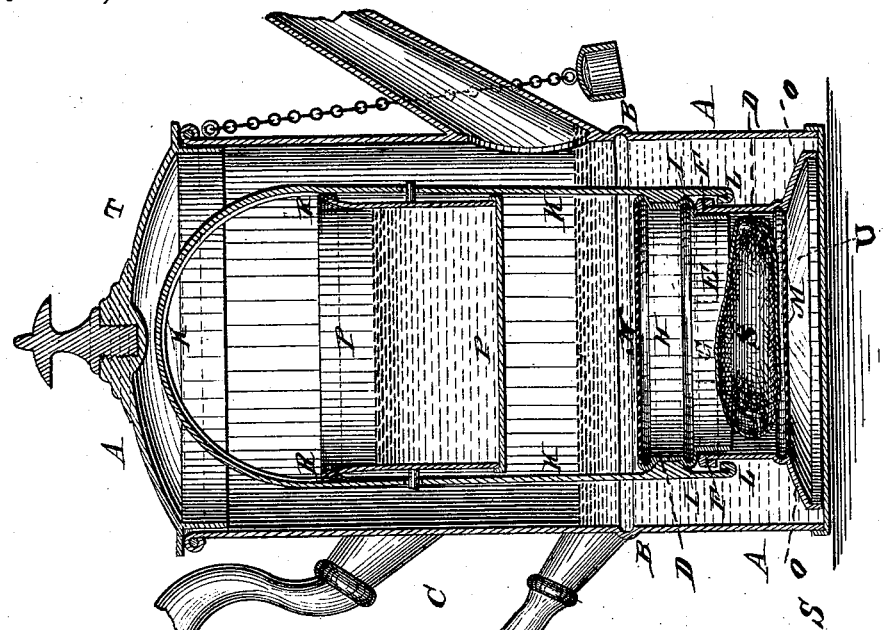
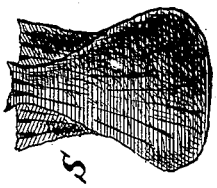
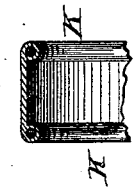
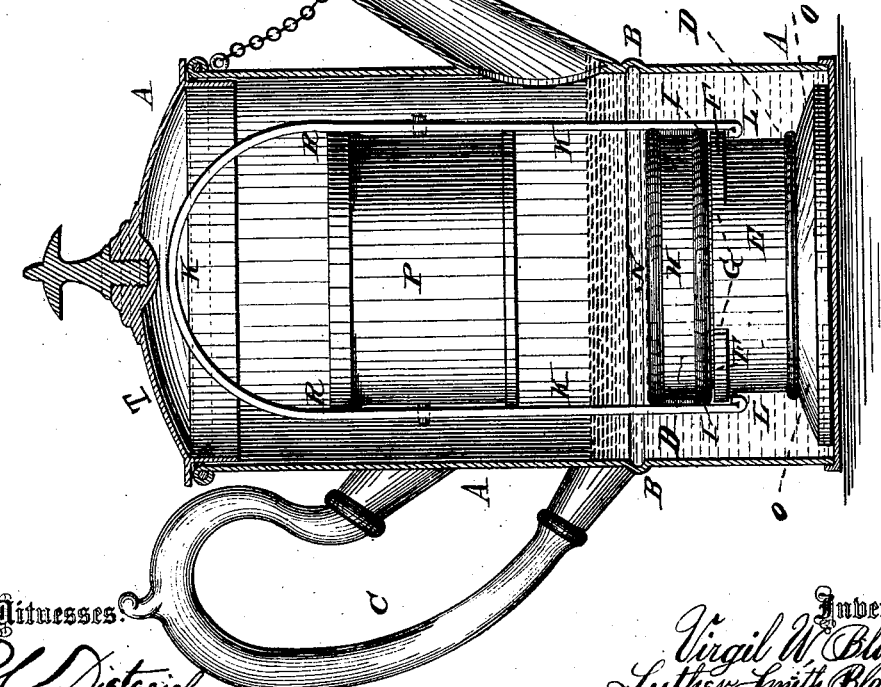
Witnesses:
Inventors:
Virgil W. Blanchard
Luther Smith Blanchard
Per C. H. Watson & Co. Attorneys.

UNITED STATES PATENT OFFICE.

VIRGIL W. BLANCHARD AND LUTHER S. BLANCHARD, OF WEYBRIDGE, VT.

COFFEE-POT.

SPECIFICATION forming part of Letters Patent No. 228,862, dated June 15, 1880.

Application filed October 25, 1879.

*To all whom it may concern:*

Be it known that we, VIRGIL W. BLANCHARD and LUTHER SMITH BLANCHARD, of Weybridge, in the county of Addison and State of Vermont, have invented certain new and useful Improvements in Coffee-Pots; and we do hereby declare that the following is a full, clear, and exact description of the invention, which will enable others skilled in the art to which it appertains to make and use the same, reference being had to the accompanying drawings, and to the letters of reference marked thereon, which form a part of this specification.

The object of this invention is to provide an apparatus in which coffee, tea, or any substance containing a volatile element or elements that may be separated by heat and condensed by cold water may be cooked by steam in the midst of heated water and the volatile element or elements eliminated therefrom and returned in a condensed form to the heated water.

It also consists in the novel arrangement of a chamber in which the cooking process is performed, with a steam-chamber beneath and a pivoted condenser above, all combined in an apparatus that may be readily removed from the vessel containing the water in which the process is carried on, all the parts being so simple in construction and so accessible in the subsequent process of cleansing and adjustment as to combine the greatest simplicity with the greatest practical efficiency.

In the drawings, Figure 1 represents an elevation of our improved coffee-pot, partly in section, and Fig. 2 a vertical section of the same. Figs. 3 and 4 are details, showing the arch and cloth strainer respectively.

The letter A represents an ordinary coffee-pot, which does not differ in construction from any ordinary tea or coffee pot, excepting at the point B just below the handle C, where there is formed a bead or swell in the vessel extending around its entire circumference.

The letter D indicates a movable cooker, consisting of a chamber or receptacle, E, for the coffee or substance to be cooked, and having upon its upper edge a flange, F, which is cut away at G G.

The letter H represents the cover of the receptacle E, adapted to fit for a short distance in said receptacle, and provided with a bead, I, on its outside, which sets upon the upper edge of the receptacle E.

The letter K indicates an arch composed of thin metal. The legs of said arch are firmly secured to the cover of the coffee chamber or receptacle E, extending below, with inward projections L, which, coming in contact with the flanges F on the receptacle as the cover is turned after being placed upon said receptacle, make a firm fastening for the two.

It will be observed that both the cover H and the bottom of the coffee receptacle or chamber are formed with perforated metal diaphragms M N, that will allow a free passage of steam and water through the perforations.

The letter O indicates a skirt or flange attached to the bottom of the coffee receptacle or chamber E, forming, when the movable cooker is placed in the pot A, a steam-chamber, U, beneath the coffee receptacle or chamber E. It will be observed that the skirt or flange extends outwardly so as to cover almost the entire surface of the bottom of the pot A.

The letter P indicates a cylindrical vessel mounted upon pivots or trunnions in the legs of the arch K. It will be observed that this vessel is placed directly above the coffee receptacle or chamber E, so that steam or vapor passing through the perforated cover N would come directly in contact with bottom and sides of said vessel P. It will also be observed that by revolving the cylindrical vessel P upon its pivots or trunnions its contents may be emptied into the pot A, and that it may be kept in position by a projection, R, engaging the edges of the arch K.

The letter S indicates a cloth strainer in the coffee receptacle or vessel E.

In the practical operation of our invention coffee, tea, or any substance to be cooked is placed in the coffee chamber or receptacle E. The cover of said chamber E is then firmly secured by the lock-joint before mentioned. If the coffee or substance to be cooked is a very fine powder, it may be enveloped in the cloth strainer S, which will prevent the escape of any very fine particles through the perforations in the top and bottom of said chamber. It will be understood that we claim the cloth strainer only as an accessory to be used under certain circumstances. Then the pivoted vessel or condenser should be filled with cold water, after which the pot A should be filled with boiling water up to the bead B, that surrounds the pot on its entire circumference. Then the movable cooker should be placed in the pot, which should be closed by its cover T, and boiled a sufficient length of time to eliminate the volatile element or elements from the substance contained in the coffee receptacle or chamber E.

It will be observed that the steam that is formed in the steam-chamber U will pass directly through the bottom of the coffee-chamber E, then through the substance to be cooked within said chamber, and then through the top of said chamber, through the perforations therein, and, coming directly in contact with the surface of the pivoted vessel or condenser, will be condensed and returned to the heated water in the pot A. In this manner any volatile element or elements contained in the substance that is cooked may be certainly and speedily eliminated and returned to the heated water in the pot A.

It is to be understood that the heated water in the pot shall never rise above the bottom of the pivoted condenser.

Having thus fully described our invention, what we claim, and desire to secure by Letters Patent, is—

1. The coffee chamber or receptacle E, in combination with the pivoted condenser P, arch K, and flange or skirt O, forming a steam-chamber, U, as and for the purposes specified.

2. The arch K and pivoted water-holding condenser P, in combination with the coffee-chamber E and steam-chamber U, substantially as and for the purposes set forth.

3. The water-holding condenser P, pivoted on trunnions in the arch K, as and for the purposes specified.

4. The lock-joint composed of the flanges F F, in combination with the cover H and the inward projections on the legs of the arch, whereby the coffee-chamber may be readily opened and securely closed, substantially as specified.

5. The movable cooker D, having coffee-chamber E and perforated top and bottom, in combination with the steam-chamber U, arch K, and pivoted condenser P, substantially as and for the purpose set forth.

In testimony that we claim the foregoing as our own we have hereto affixed our signatures in presence of two witnesses.

VIRGIL W. BLANCHARD.
   LUTHER S. BLANCHARD.

Witnesses:
 AUGUSTA E. WELLS,
 BERTHA A. BLANCHARD,
 Mrs. GEORGE PERKINS.